United States Patent
Pecot et al.

(10) Patent No.: US 6,386,512 B1
(45) Date of Patent: May 14, 2002

(54) PORTABLE APPARATUS FOR LAYING A CABLE INSIDE A CONDUIT

(75) Inventors: Alain Pecot; Daniel Lecoq, both of Lannion; Gerard Le Goff, Perros Guirec, all of (FR); Aandzej Wacinski, Massongex (CH)

(73) Assignee: Plumettaz SA, Bex-Suisse (FR)

( * ) Notice: Subject to any disclaimer, the term of this patent is extended or adjusted under 35 U.S.C. 154(b) by 0 days.

(21) Appl. No.: 09/582,431

(22) PCT Filed: Dec. 24, 1998

(86) PCT No.: PCT/FR98/02884

§ 371 Date: Aug. 31, 2000

§ 102(e) Date: Aug. 31, 2000

(87) PCT Pub. No.: WO99/34492

PCT Pub. Date: Jul. 8, 1999

(30) Foreign Application Priority Data

Dec. 26, 1997 (FR) .............................................. 97 16818

(51) Int. Cl.$^7$ .............................................. B65H 59/00
(52) U.S. Cl. ................................................... 254/134.4
(58) Field of Search ......................... 254/134.4, 134.3 R

(56) References Cited

FOREIGN PATENT DOCUMENTS

| EP | 0 108 590 A | 5/1984 |
|---|---|---|
| FR | 2 551 593 | 3/1985 |
| WO | 95 11540 A | 4/1995 |
| WO | 95 23988 A | 9/1995 |
| WO | 98 12588 A | 3/1998 |
| WO | WO 98/12588 | * 3/1998 |

* cited by examiner

*Primary Examiner*—Robert C. Watson
(74) *Attorney, Agent, or Firm*—Lowe Hauptman Gilman & Berner, LLP

(57) ABSTRACT

This invention was a portable pushing and pulling apparatus for in-conduit cable installations, the aforementioned device is of the type which comprises a casing that, viewed from above, is in the shape of a rectangle and is formed of a base (1) joined to a cylindrical handle (4), a cover (2), a hinged joint (3) connecting the base (1) and the cover (2) on a short side, a set of screws (40) for ensuring the cover's closure on the base, a drive capstan (25) driven by a rotary drive shaft (28) mounted in the handle (4), an idler disk (29) with an axle parallel to the capstan (25), and both the capstan (25) and the disk (29) are mounted in such a way as to receive a cable (36) to be driven and gripped between them. The invention itself contains in the handle (4), between the drive shaft (28) and the power take-off (53), a torque regulating device at its end, for the torque limiting clutch which indicates the maximum pushing or pulling force selected by the operator.

13 Claims, 13 Drawing Sheets

PORTABLE APPARATUS FOR LAYING A CABLE INSIDE A CONDUIT

This invention is comprised of a pulling and pushing apparatus for installing cables, and especially fibre optic cables, in conduits between chambers. The chambers are still called pulling chambers as the traditional pulling method was used in them, especially for high-capacity metallic circuit cables.

With the development of local networks in low-capacity fibre optic cables which are very light and which have a diameter in the range of two to three millimetres, civil micro-engineering conduits were developed that are each composed of several conduits six to seven millimetres in diameter.

There are several known methods for installing cable in the conduits, among which we can cite: traditional pulling using a flexible traction line in a pulling chamber at the lower end of the conduit, the pulling of which is sometimes accompanied by additional pushing at the head of the conduit; pulling with a shuttle while using a fluid that is introduced into the chamber at the head of the conduit and which acts on the sealed shuttle attached to the lower end of the cable, this pulling with the shuttle can also be accompanied by an additional pusher at the head of the conduit; the carrying is accomplished using a fluid under pressure which circulates at high speed in the conduit starting from the head of the cable and draws the cable with it, the carrying can also be accompanied by additional pushing.

Traditional pulling and shuttle pulling are well known. Portage, of recent use, has been the subject of several descriptions, for example in documents EP-A-0 108 590, EP-A-0 292 037. Other documents, such as EP-A-0 445 622, EP-A-0 544 388, CH-A-587 575 describe methods similar to carrying.

In document EP-A-0 108 590 published on 16.05.84, there is a description of a carrying process for pulling optical fibres girdled by soft light weights in a conduit previously installed on-site. Inside the conduit the friction of the fluid flowing through it at high speed over the cable exerts a pulling force and pulls the cable along with it. The document also describes an example of making an apparatus which, placed at the head of the conduit, contains an enclosure in which a high pressure fluid source feeds the conduit in the direction of pulling the cable and, in addition, contains a pair of rubberized drive wheels aimed at compensating for the force in the opposite direction of the girdled fibres' advance due to the prevailing positive pressure inside the enclosure at the cable's entry point.

In document FR-A-0 292 037 published on 23.11.88, there is also a description of an apparatus which differs from the apparatus described in document EP-A-0 108 590 by the nature and function of the pushing mechanism as, in addition to the compensation for the above-mentioned opposing forces, the pushing mechanism is capable of providing an additional essential push to add to the insufficient force exerted by the carrying force, in order to allow a heavy rigid cable to be fed through it.

In document EP-A-0 445 622 published on 11.09.91 for the installation of a fibre optic cable, especially in a vertical conduit, there is a description of a pulling apparatus which reduces the friction effect, in which the flow of the fluid is created in the direction opposite to the cable's advance, this flow causing a buoyancy which works according to Archimedes' principle, and which moves the cable away from the conduit's wall and reduces the mechanical friction.

In document EP-A-0 544 388 published on 02.06.93, a portable apparatus is described which is used to make a cable move along inside a conduit by applying to it a stream of liquid with a Coanda effect.

In document CH-A-587 575 on 13.03.77, there is a description of a compressed air pistol used to propel a length of thread inside a canal provided in a wall for housing electrical wires.

The traditional methods, with or without a shuttle, and the methods which use a liquid under pressure for carrying purposes or for creating buoyancy according to Archimedes' principle, and combinations of them, have given industrialists the opportunity to propose equipment which are specific to each of the above-mentioned methods. Thus, for example, pulling requires a winch with a device to measure and regulate the traction exerted; for the push-pull with a liquid medium referred to in the documents cited above, several different devices have been proposed. Each of these different devices represents a sizeable investment which increases the cost of the controlled installation of fibre optic cables in work sites either inside or outside buildings, or between them.

One purpose of the invention described herein consists of providing a universal portable apparatus for the controlled installation of fibre optic cables in conduits in civil micro-engineering. By controlled installation, we mean the introduction of a cable into a conduit inside or outside a building by a mechanical means which exerts traction or a thrust on the cable, the traction or the thrust does not exceed a set value supplied by the operator on the basis of the values indicated by the cable manufacturer, or on the basis of the device's calibration operation performed on the work site.

By portable, we mean a light apparatus, easily transported and used by a single operator in a tight space.

By universal, we mean a cable installation apparatus which serves as a winch or pulling capstan, intermediary carrier and puller-pusher of a liquid medium injection and carrying device, which can be driven by any type of mechanical energy source turning at a controlled speed, for example an electric or pneumatic hand drill of the type commonly used on construction sites.

We already know of such portable pushing and pulling devices for conduit cable installation and we may refer, among others, to patent documents WO-A-95 23988 and FR-A-2551 593. Generally, such a device is of the type that has, on the one hand, a drive capstan driven by a rotary drive shaft mounted in a handle and, on the other hand, an idler disk with an axle parallel to that of the capstan, and the capstan and the disk are designed to receive a cable to be driven and held between them.

For example, the capstan and the disk are housed in a casing that is formed of a base connected to the handle and a cover. A hinged joint is provided to connect the base and the cover on the short side, as well as a set of screws for ensuring the closure of the cover on the base.

We have attempted to provide an apparatus built in such a way that the thrust and pull force remains constant under all conditions of use.

In relation thereto, according to the present invention, an apparatus built according to this invention is characterized by the fact that it contains, in the handle, between the drive shaft and the power take-off, a torque regulating device at one of its ends for the torque limiting clutch which indicates the amount of the maximum pushing or pulling force selected by the operator.

According to another characteristic of the invention, it includes a means of regulating the radial pressure which the idler disk exerts on the cable to be handled. The regulation device is appropriately comprised of an angle bracket formed by two arms on the corner of which the axle of the idler disk is mounted, one of the arms is mounted on a fixed pivot perpendicular to the bottom of a hollow in the base in which is found the idler disk and the other bearing a nut through which a regulating screw pivoting around a pivot fixed in relation to the base passes, and the regulating screw which is capable of being turned at will by the operator by the use of an external thumb wheel.

According to another characteristic of the invention, in the central area of the base of the cover an inspection hole appears, which makes it possible to at least partially see the idler disk and evaluate how the cable is driving it.

According to another characteristic of the invention, the base has a compressed air inlet valve so that, when closed, the interior of the apparatus can be pressurized and the exit bushing, through which the cable to be pushed comes out, has an internal diameter which is greater than that of the cable so that the pressurized air can escape through it between the cable and the internal cylindrical wall of the exit. Moreover, the entry bushing, through which the cable to be pushed enters, is appropriately designed to be used to mount, on the inside, a sealing nipple through which the cable passes as it enters the apparatus.

The nipple also appropriately includes a circular hollow foot which fits into a circular groove in the entry bushing, extended by a hollow cylindrical body, then by a hollow conical point, the material of which forms the point which is translucid or transparent, the point is cut in such a way that the circle formed by the cut ensures a seal around the cable.

According to another characteristic of the invention, on each side of the base is found the first half couplings provided on the edges of the base and extended in an external flange, each of the half couplings respectively bear a bushing of which the external diameter corresponds to that of the first half couplings and of which the internal diameter depends on that of the cable to be driven, and, facing the first half couplings are the edges of the cover which holds the second half couplings, which, when the apparatus is closed, will fit into the first half couplings and form rotation sleeves into which the bushings are respectively housed.

According to another characteristic of the invention, the idler disk has a magnet on its outer edge that drives a revolution counter of which the display is visible in a window in the cover. According to another characteristic of the invention, the apparatus has an associated shuttle which has a cylindrical axial rod that itself has a tip in the shape of a larger hemispheric head, followed towards the back by a flared skirt which starts from the periphery and continues until it meets a fine raised ring.

According to another characteristic of the invention, on the exit side where the cable to be pushed comes out, there is an entry orifice of which the axis is tangent to the capstan, as the entry orifice is formed by cylindrical half couplings respectively provided in the edges of the base and the cover.

The above-mentioned characteristics of this invention, as well as others, will appear more clearly on reading the following description of examples of usage, as the description is presented in relation to the attached drawings, among which:

Figure 1:
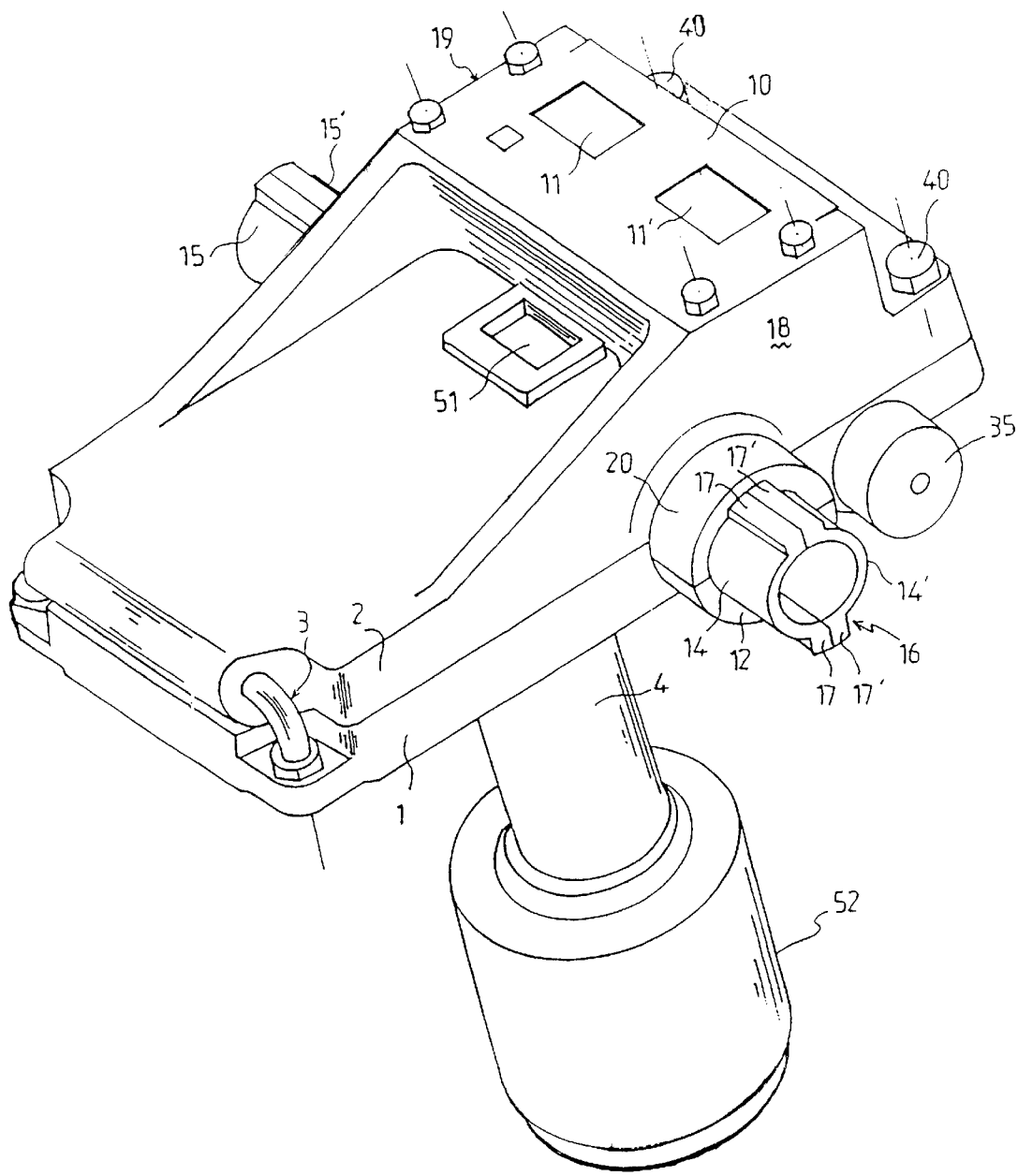
FIG. 1 is a perspective view of the closed apparatus, prior to use.
Figure 2:
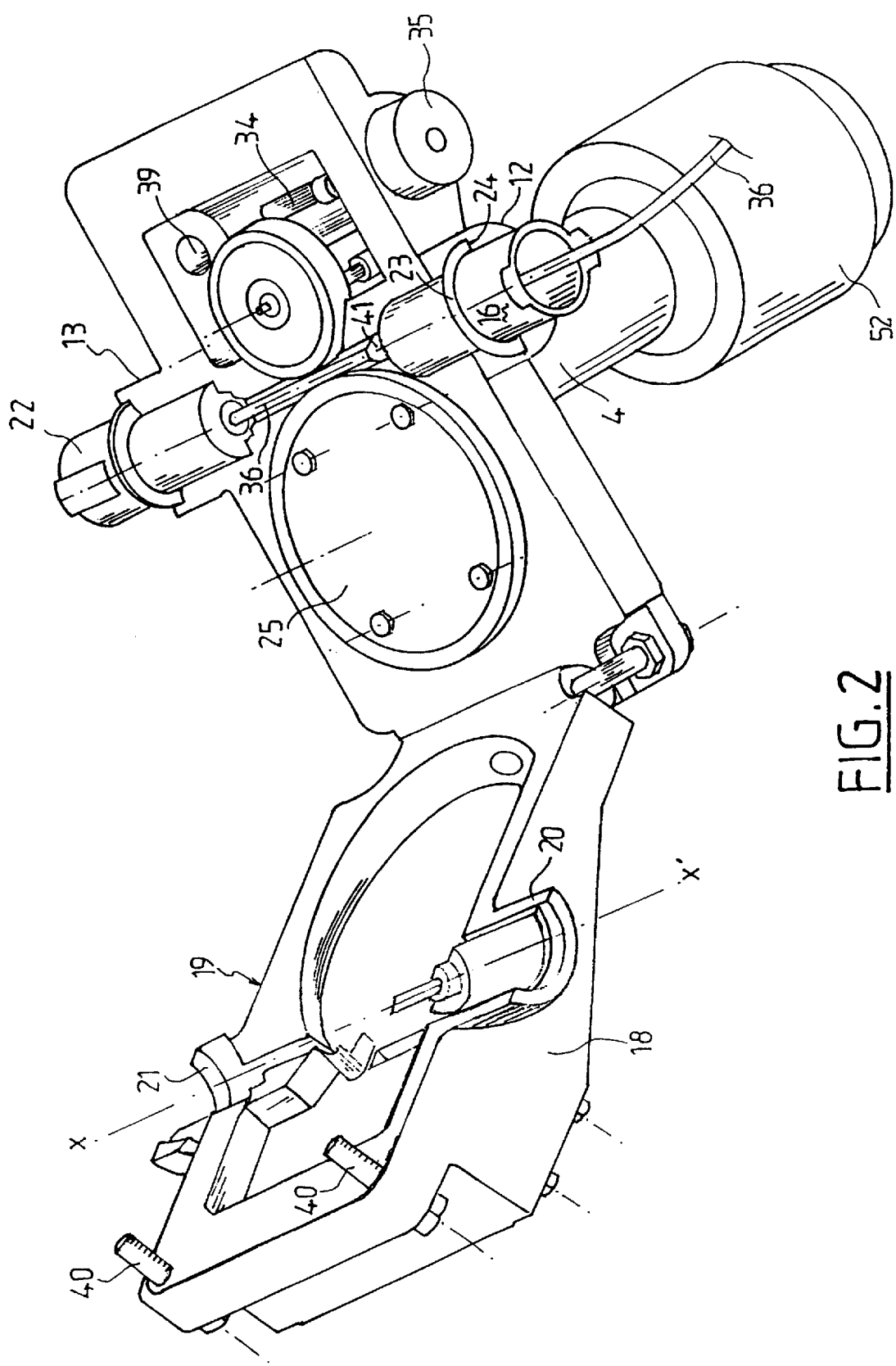
FIG. 2 is an angled view of the open apparatus, which shows the base of the apparatus as seen from above.
Figure 3:
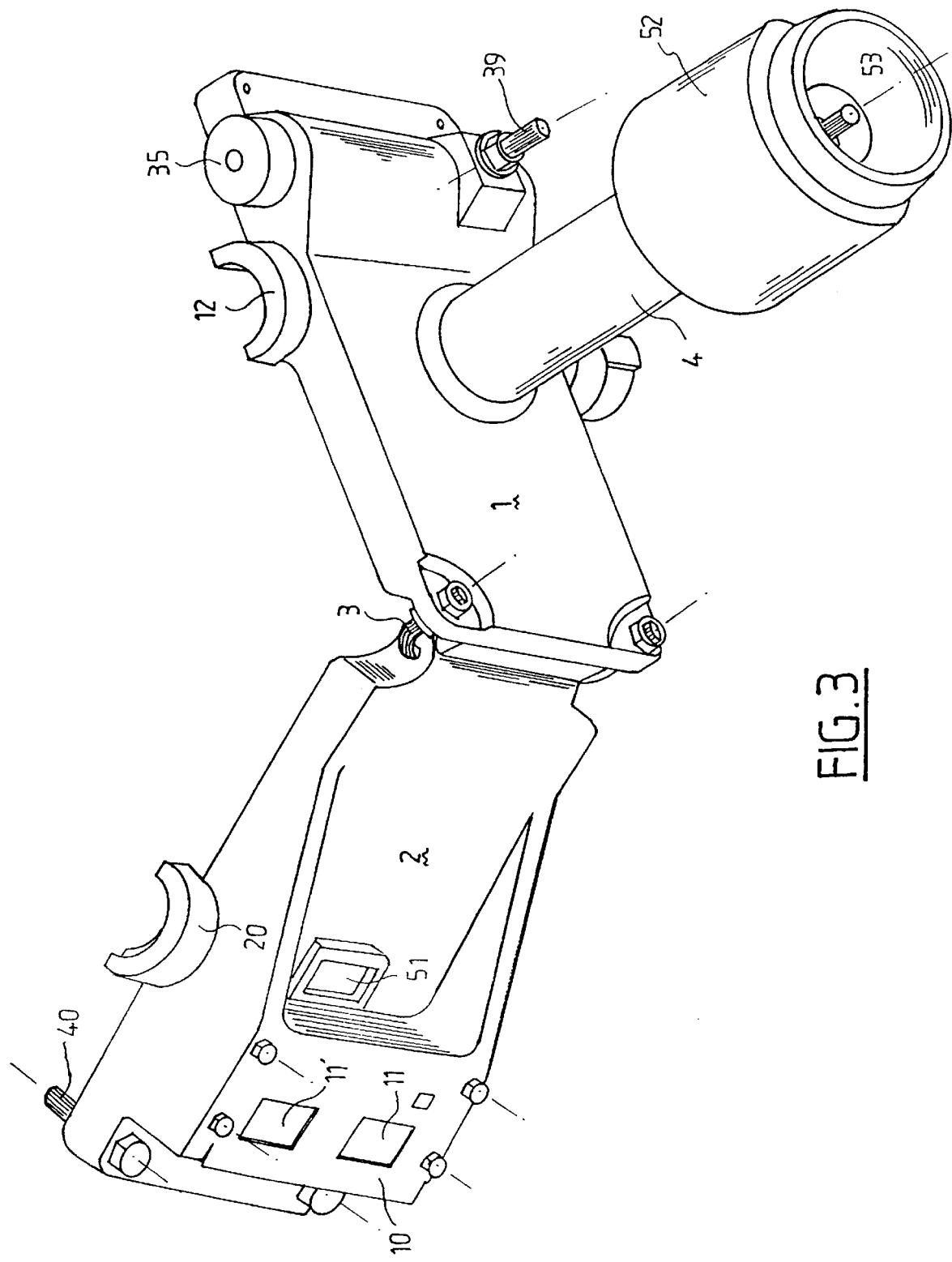
FIG. 3 is an angled view of the open apparatus, which shows the base of the apparatus as seen from below.

As is shown in the views in FIGS. 1, 2 and 3, the universal portable apparatus of the invention has the appearance of a small box comprising a base 1 and a cover 2, connected by a hinge 3, the base 1 is fixed, in its central portion, at the end of cylindrical handle 4.

Figure 4:
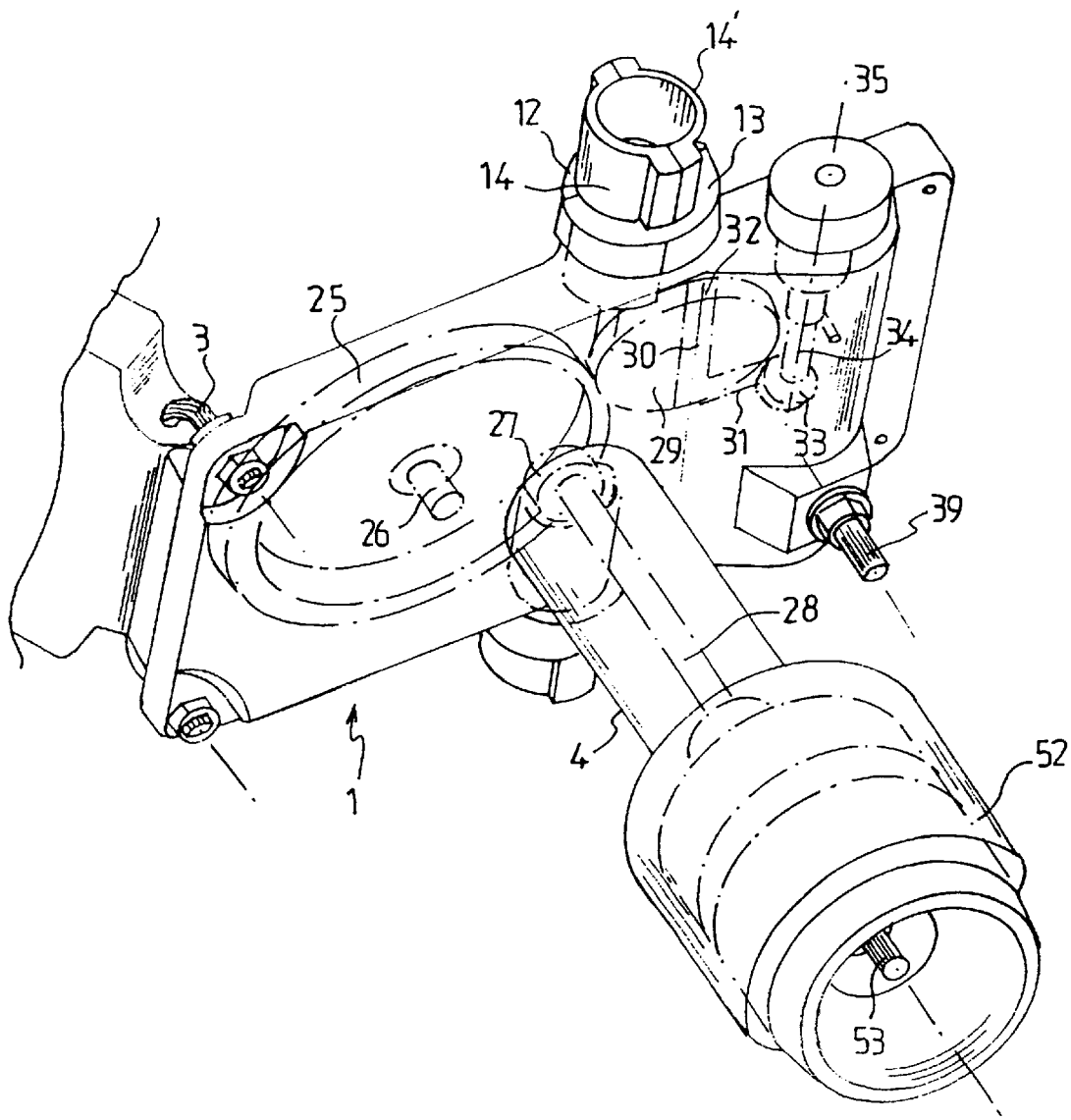
FIG. 4 is an angled view of the open apparatus, which shows an overhead view of the moving parts of the apparatus, the stationary parts of which are drawn in broken lines.
Figure 5:
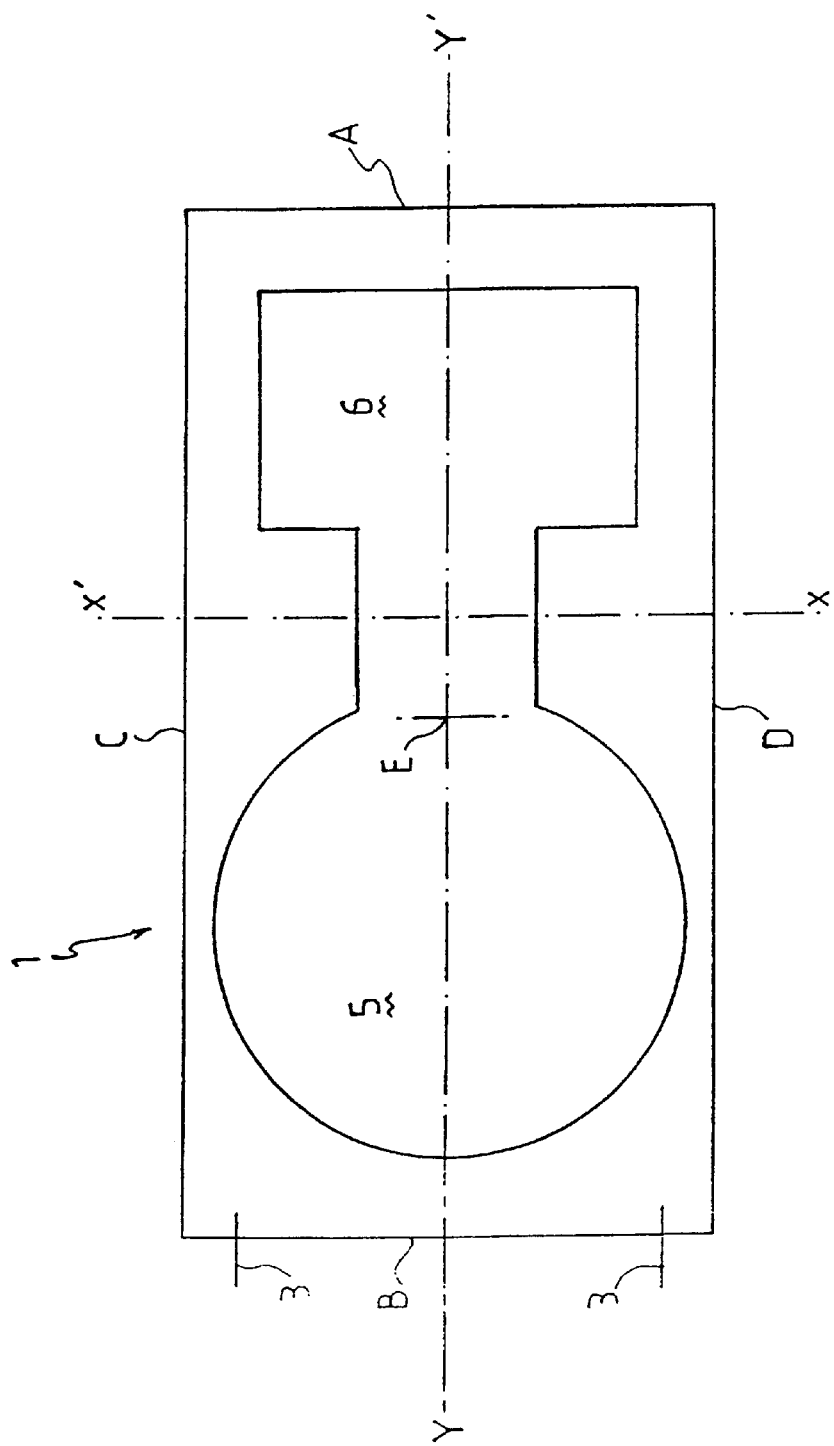
FIG. 5 is a diagram which illustrates the base of the apparatus as seen from the top.

The base 1 of the box is a plate which, in the schematic top view of FIG. 5, has the shape of a rectangle formed with two short sides A and B, and two long sides, C and D. The rigid plate of the base 1, in plastic or metallic material, has an upper surface which, on side B of the rectangle where hinge 3 is found, presents a cylindrical hollow 5 and, towards side A of the rectangle, a second hollow 6, and a lower surface 7, FIG. 6, which is flat and parallel to the upper surface starting from side B, and having, beneath the hollow 6, a bulging part 8, and which, in its central part, is joined to one end of the handle 4. The revolution axis 9, FIG. 4, of the cylindrical handle 4 is perpendicular to the plane of surface 7 and protrudes noticeably at the centre E of the rectangle of the base 1, FIG. 5.

The cover 2 of the box, also a top view, is in the shape of a rectangle which is the same dimension as the base 1 so that it fits onto it, as shown in the angled view in FIG. 1 of the closed apparatus, with longitudinal and transversal edges to cover the elements mounted on the base plate 1, as shown in the angled view in FIG. 2 of the open apparatus. Seen in a longitudinal cross-section, cover 2 comprises, beginning at hinge 3, a rigid plate made of plastic or metal that is first flat and which then presents, over the hollow 6 (when viewing the apparatus in its closed position), an elevation creating a chambre 10 in which display screens 11 and 11' are housed.

In the FIG. 5 schematic view, between the centre E and the short side A, as illustrated, there is a transversal line XX' which symbolizes the axis of a cable that the invention is intended to handle (to pull or push). As FIGS. 2 and 3 clearly show, the long sides C and D of the base 1 are respectively equipped with short half couplings 12 and 13 each of which has a semi-circular transversal section that extends as a flange beyond and on each side of the rectangle of the base 1. The half couplings 12 and 13 are transversally aligned and coaxial to the XX' axis line. The straight section of couplings 12 or 13 resembles a half crown of which the diametrically opposed ends are in the plane of the upper surface of base 1.

The half couplings 12 and 13 are respectively made to hold half bushings both 14 and 14', and 15 and 15'. Bushing 16, formed by the assembly of half bushings 14 and 14', has a cross-section in the shape of a circular crown the external diameter of which corresponds to the internal diameter of the half coupling 12 or 13. The coupling plane of the half bushings 14 and 14', which form bushing 16, is perpendicular to the plane of surface 7. In FIG. 1, we can see that each half bushing 14 and 14' offers, next to this coupling plane, external radial flanges 17 and 17' that are applied to each other to correctly position the half bushings 14 and 14'.

As FIGS. 1 and 2 show, the longitudinal edges 18 and 19 of the cover 2 are respectively notched and equipped with short half couplings 20 and 21. Half coupling 20 has the same semi-circular cross-section as half coupling 12 and such a position on the edge 18 that it overlaps bushing 16 when the apparatus is closed as shown in FIG. 1. Half couplings 12 and 20 have transversal grooves parallel to line XX' in order to house radial flanges 17 and 17'.

Half coupling 13 matches half coupling 21 and, when the apparatus is closed, as in FIG. 1, the half couplings are used to house bushing 22 formed by the assembly of half bushings 15 and 15', which are very similar to half bushings 14 and 14'. Later, we will point out any existing differences. In order to position bushings 16 and 22 transversally in their respective couplings, they are equipped with circular crowns 23 as flanges which fit into the circular grooves 24 made in the half couplings and which are used as end stops. Bushing 22, formed by half bushings 15 and 15', is exchangeable, which means that its external diameter is fixed to fit half bushing 13 and 13', but its internal diameter is selected according to the diameter of the cable to be pushed and the diameter of the conduit into which the cable is to be pushed. The same applies to bushing 16 formed by half bushings 14 and 14', except that at the point at which it enters the apparatus the nipple, which will be described later, will be installed.

Figure 6:
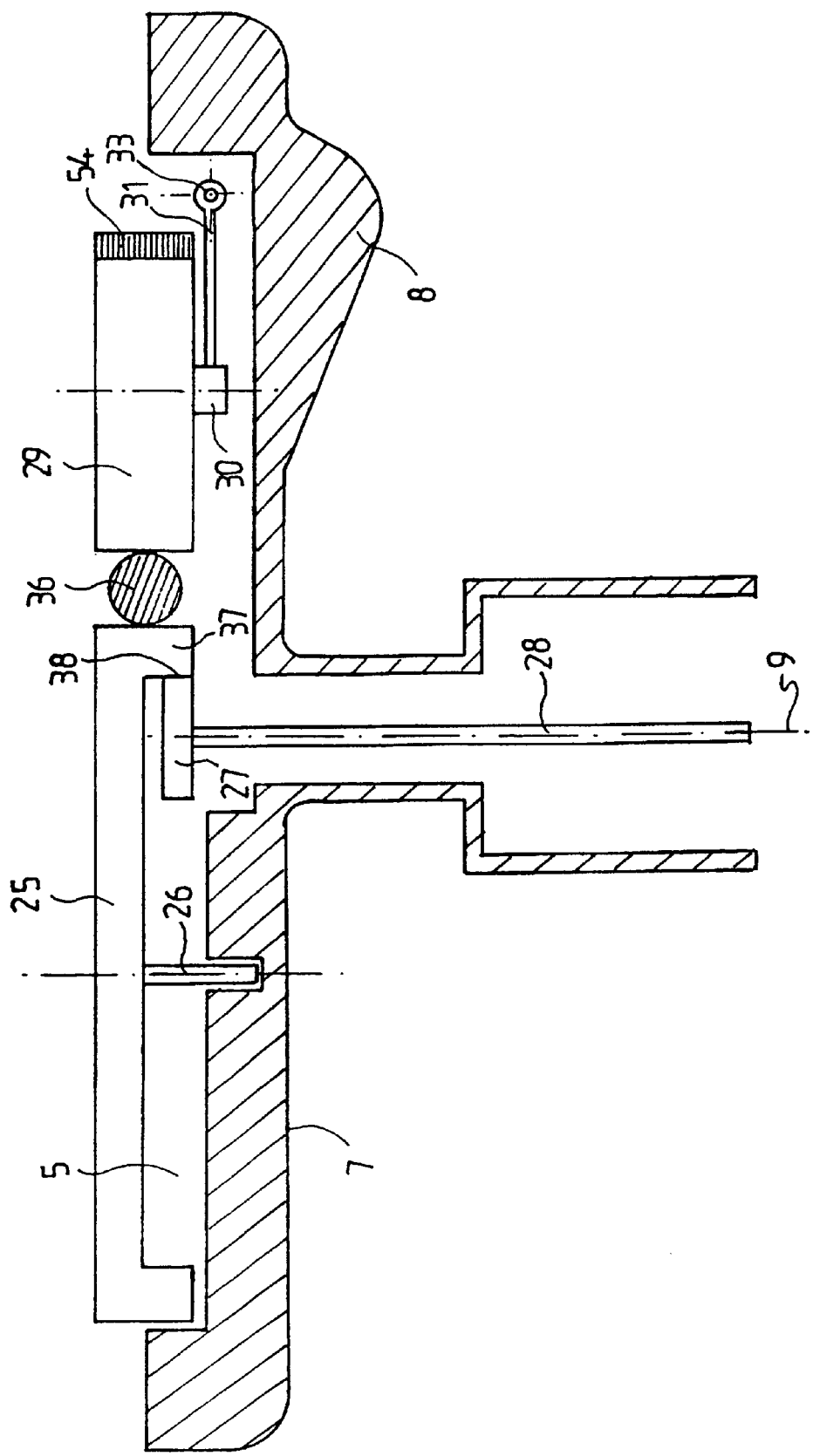
FIG. 6 is a cross-section of the base of the apparatus following the YY' line of FIG. 5.

As shown in the angled views presented in FIGS. 2 and 4 and the schematic cross-section presented in FIG. 6, in the hollow 5 in the base plate 1, a rotary disk or capstan 25 is mounted on an axle 26, anchored in the base of the hollow 5, and it has a lower sprocket wheel which is turned rotated by a hypocycloid gear 27 mounted at the end of a drive shaft 28 located in the cylindrical handle 4. The axis of the shaft 28 is the same as the revolution axis 9. The rim of the capstan 25 is coated with a relatively rough but non-abrasive covering. The rim is used to drive the cable in question.

In hollow 6, the support disk or wheel 29 is mounted by its axle on the corner of an angle bracket, FIGS. 4 and 6, that consists of two perpendicular arms 30 and 31. The far end of arm 30, facing the corner of the angle bracket, is mounted to pivot on a pivot 32 which is anchored to the base of the hollow 6. The far end of arm 31, facing the corner of the angle bracket, is in the shape of a nut 33 into which is screwed the regulating screw 34 which passes through the edge of hollow 6 to the outside of base 1 and which has, at its free end, a thumb wheel 35 which can be turned by the operator.

Together, the capstan 25 and the wheel 29 form a cable 36 pulling or pushing element, as shown schematically in FIG. 6, the cable 36 entering the apparatus through bushing 16 and leaving through bushing 22. The capstan 25 is the drive disk which rubs against the cable sheath 36 and moves it by friction. The sheath of the cable 36 also touches the support wheel 29 and drives it as it idles on its axle. The axle position of the capstan 25 is fixed, as we mentioned earlier, while the axle position of the wheel 29 can be altered. When the operator wants to adjust the position of the support wheel 29 in relation to the position of the capstan 25, in order to move them slightly closer or further apart in relation to the diameter of the cable 36, he turns the thumb wheel 35 so that the screw 34 enters more or less into the nut 33, which causes the angle bracket to turn on the pivot 32 and moves the axle of the wheel 29.

The lower surface of the capstan 25 has sprocket wheel 37 that engages the sprocket wheel 38 of the gear 27 driven by the drive shaft 28. As we mentioned earlier, by preference, the lower part of handle 4 acts as a kind of power take-off which drives the shaft 28, and the power take-off which can be connected to a portable energy source, for example a common electric hand drill, by means of a flexible, removable drive shaft.

Again, the invention's apparatus has an air inlet valve 39 which allows compressed air to be fed into the apparatus, the cover 2 being equipped with a seal, not illustrated, so that when the apparatus is closed, as in FIG. 1, the interior enclosure in which the capstan 25, the support wheel 29 and the cable 36 are found, is pressurized with air which can escape between the interior cylindrical wall of the exit bushing 22 and the cable 36 into the conduit into which the cable is driven. As FIGS. 1, 2 and 3 show, the screws 40 are used to close and seal the apparatus, as the joint must be taken into consideration, and tighten the cover 2 on the base 1.

Figure 7:
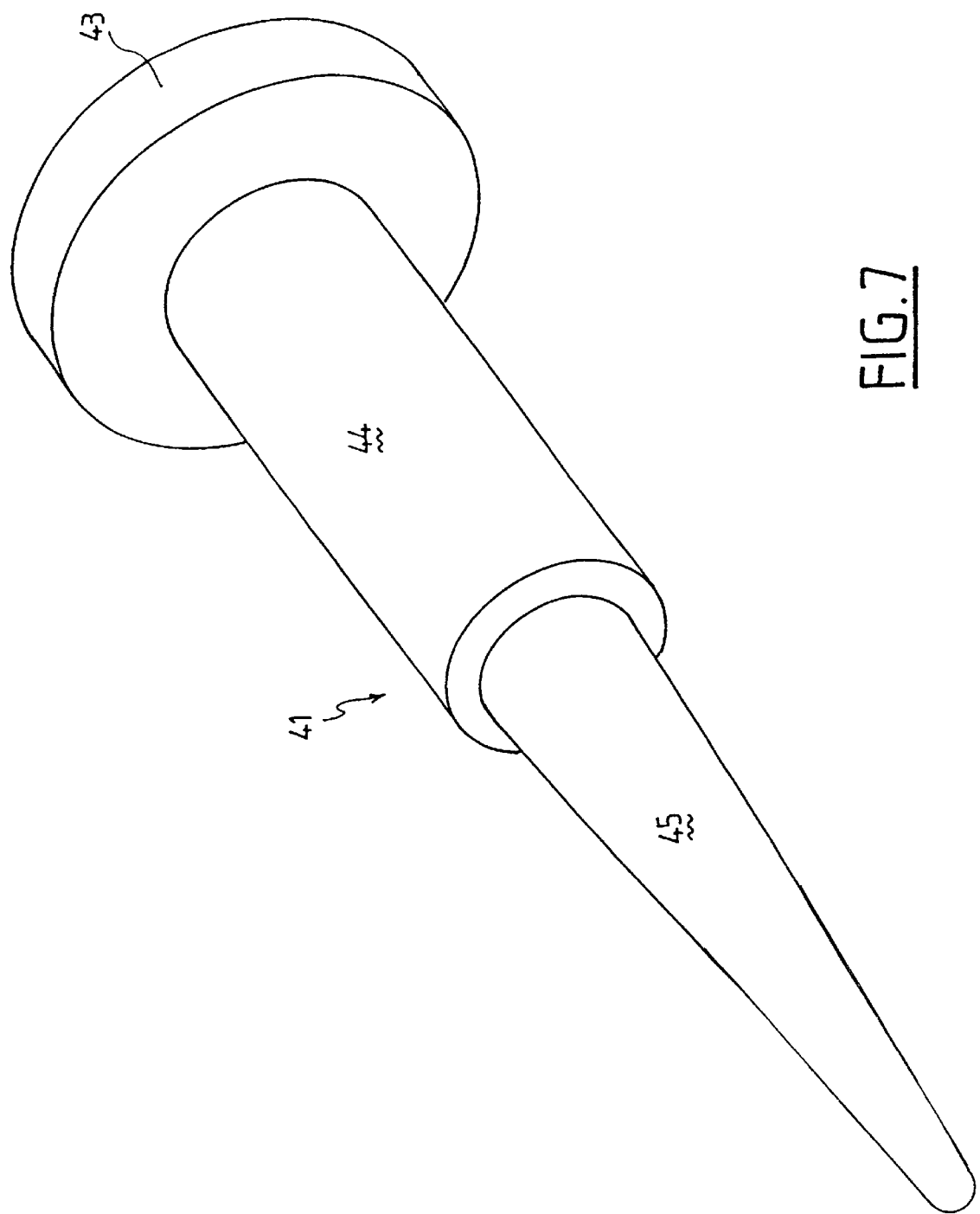
FIG. 7 is an angled view of an example of a design for a nipple which is usable in the invention apparatus.
Figure 8:
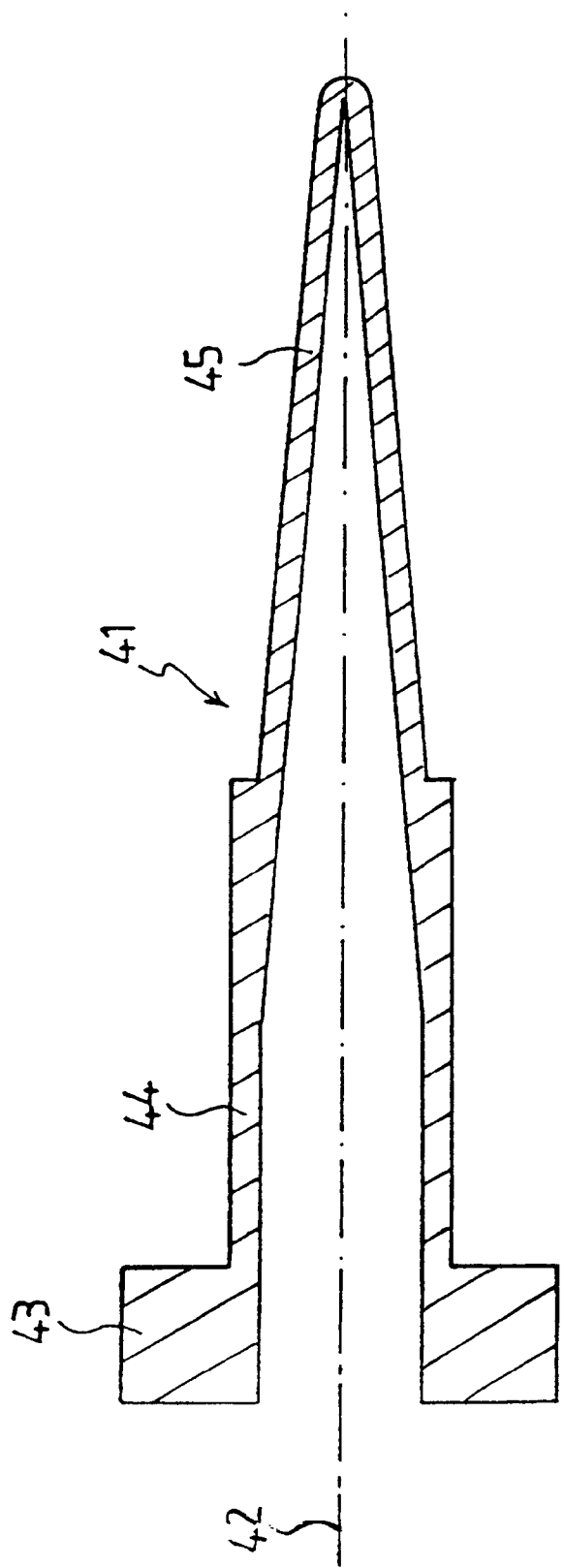
FIG. 8 is a longitudinal cross-section of the nipple in FIG. 7.

Obviously, the compressed air must not escape through the entry bushing 16. For that purpose, a nipple 41, shown in FIG. 2, is provided at the exit of bushing 16, and is directed toward the inside of the apparatus. The nipple 41 is shown in more detail in FIGS. 7 and 8, and it has a hollow body revolving around an axis 42, in which we can differentiate three parts 43, 44 and 45. Part 43, or foot 43, is cylindrical, hollow and fairly thick in both height and width, and it is followed by a cylindrical, hollow and less thick but much higher body 44. The body 44 is followed by a hollow, relatively thin conical point 45. Foot 43 is used to attach nipple 41 cross-wise in bushing 16, each half bushing 14 or 14' respectively providing on its internal wall a demi-gorge, not shown for simplicity, for housing half of the foot 13, as the demi-gorge is provided on the inside of bushing 16.

Of course, before using the nipple 41, the end of point 45 of it is cut so that the cable 36 can pass through it. The point of contact between the end of nipple 41 and the cable 36 must be leakproof. For that reason, nipple 41 is preferably made of a translucid plastic material, for example injection moulded PVC, which allows one to insert the cable to be handled into foot 43 until it stops on the internal conical wall of point 45. When stop contact is reached, the tip of the nipple is cut at a right angle to the extremity of the cable which is clearly visible through the nipple, especially since the cable sheath is generally black.

A nipple 41 is essential, for example, when the apparatus is used in the air flow carrying mode, to make sure the compressed air entering by valve 39 and intended to exit around the cable through bushing 22 does not escape through bushing 16. That also applies when cable installation is done with a shuttle.

Figure 9:
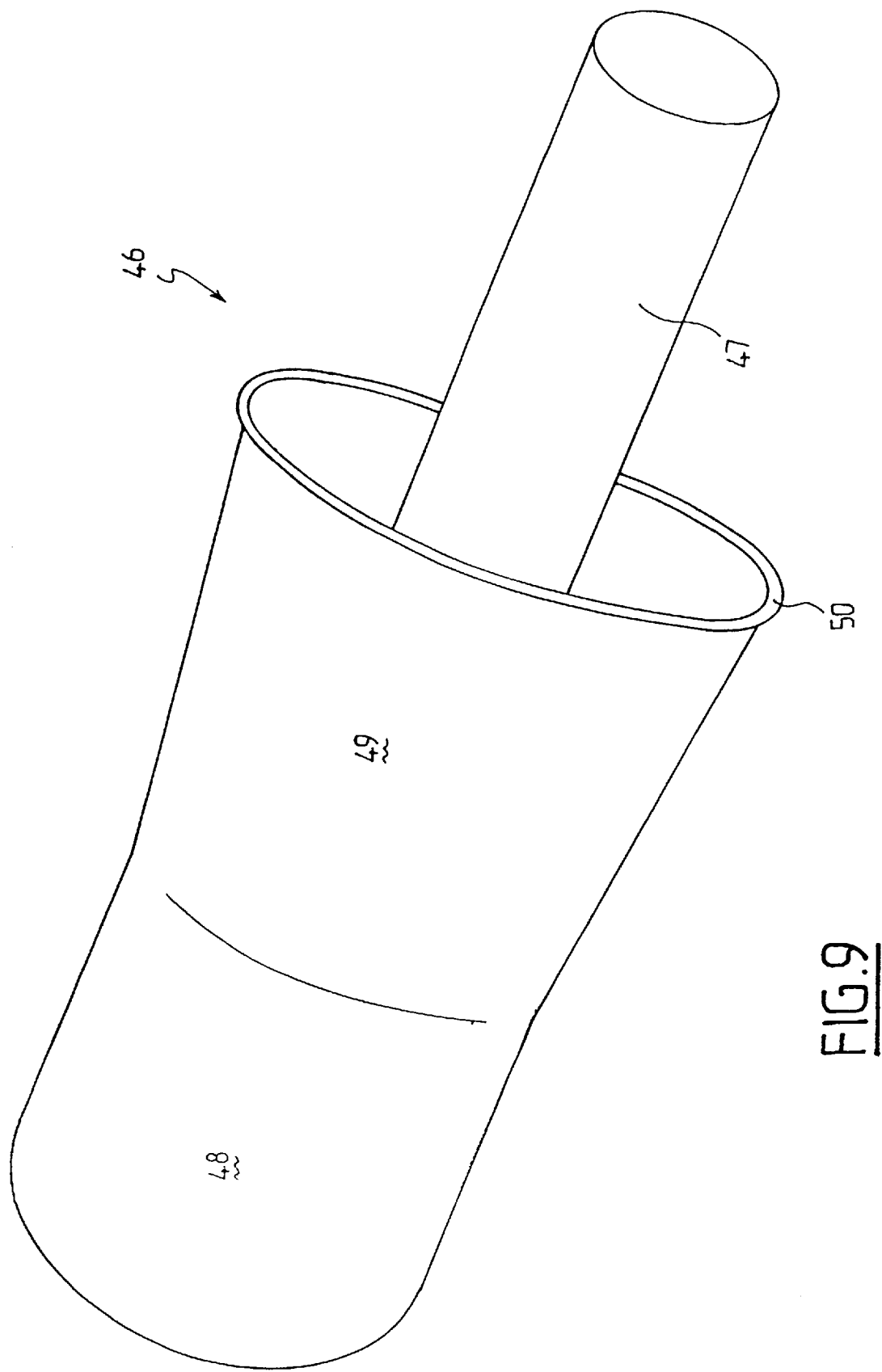
FIG. 9 is an angled view of an example of a design for a shuttle which is usable as an accessory with the invention apparatus.
Figure 10:
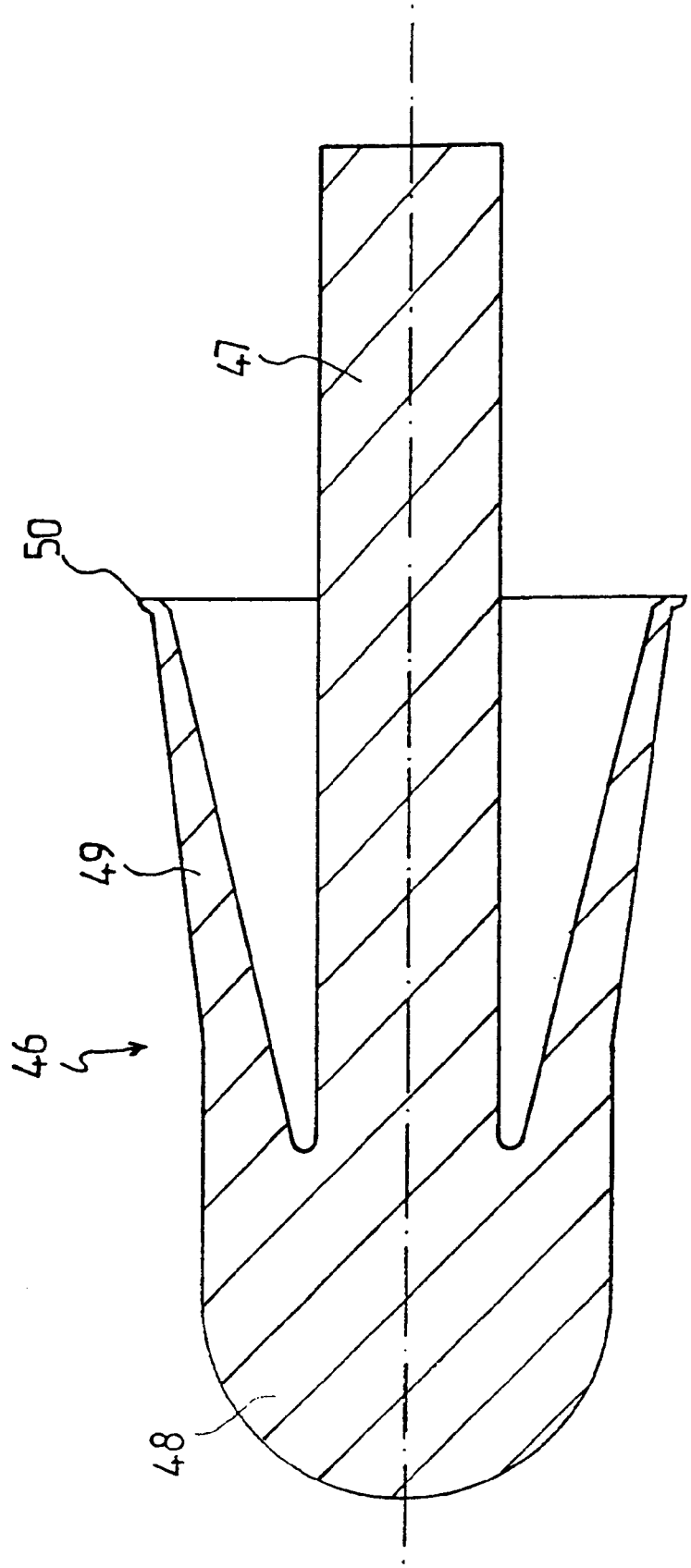
FIG. 10 is a longitudinal cross-section of the shuttle in FIG. 9.

FIGS. 9 and 10 show a shuttle 46 that has a round shape and a cylindrical axial rod 47 that has an end, not illustrated, to which is hooked the head of the cable to be pulled and a front end expanding into a hemispherical head 48 to which is attached a conical skirt 49 that opens towards the rear and ends in a fine raised ring 50.

In comparison to existing shuttles that have the drawback of creating friction against the conduit into which the cable is being installed, shuttle 46, as shown in FIGS. 9 and 10, presents numerous advantages. The hemispherical head 48, of which the diameter is less than that of the conduit, facilitates passage; the rear conical skirt 49 is soft and malleable and the diameter of the ring 50 can be adjusted to that of the conduit. Thus, this shape limits friction to a cone distance while guaranteeing a seal through the slight distortion of the flexible skirt caused by the effect of even a weak air flow pressure (1 to 2 bars) injected into the conduit around the cable.

In addition, the shape allows the same friction to be maintained when the pressure is increased up to 5 or 6 bars, in order to install greater cable lengths in a conduit. That is not the case for the traditional "skirted" shuttles of Which the friction increases substantially with pressure, because the friction surface becomes greater under the effect of the skirt's distortion due to the air pressure, since the skirt is forced up against a larger area of the internal wall.

As FIGS. 1 and 3 show, a rectangular inspection opening 51 is provided on cover 2. It is made by opening a rectangle in the base of the cover and sealing it with a transparent material, which allows the operator to view the position of support wheel 29 and cable 36 when the apparatus is closed. Inspection opening 51 allows the operator to evaluate the control of the radial pressure on the cable exerted by support wheel 29, the position of which depends on that of the thumb wheel 35. Protection against any needless stress on the cable is thereby ensured. It is also possible, during a calibration process, to observe the cable's buckling point.

It must be noted that the two accessories, nipple 41 and shuttle 46, are for a single use, and that they must be replaced after each installation as, in order to maintain a good level of performance, those that have sustained even mild wear must be discarded. The material and the moulding of those accessories allows one to obtain them at very low costs compatible with their disposable nature.

As we have already mentioned, handle 4 has, as we move away from base 1, a handle connected to a wider cylindrical part 52. In FIGS. 3 and 4, part 52 has an axle 53 which can be connected to a rotating motor. Between axle 53 and drive shaft 28, the invention contains a mechanical, fine, torque regulating clutch (not shown in detail, since it is traditional), which indicates the amount of the maximum pushing or pulling force selected by the operator. Clutch slipping does not affect the force transmitted to cable 36, or in other words, the selected force remains constant and does not fluctuate according to the torque limiting clutch slip (0 to 100%). The clutch is sealed and allows one to avoid using rotary joints subjected to a pressure difference, by thus suppressing friction interference hampering the control of the cable installation.

Furthermore, as shown in FIG. 6, the outer edge of support wheel 29 has a magnetized part 54, each turn of which, given an adequate revolution counter, is counted and translated into a number which appears on display screen 11. The number corresponds to the length of the cable pulled or pushed.

For guidance, the dimensions of the apparatus are, for example, 20 cm in length, 15 cm in width and 20 cm in height.

Figure 11:
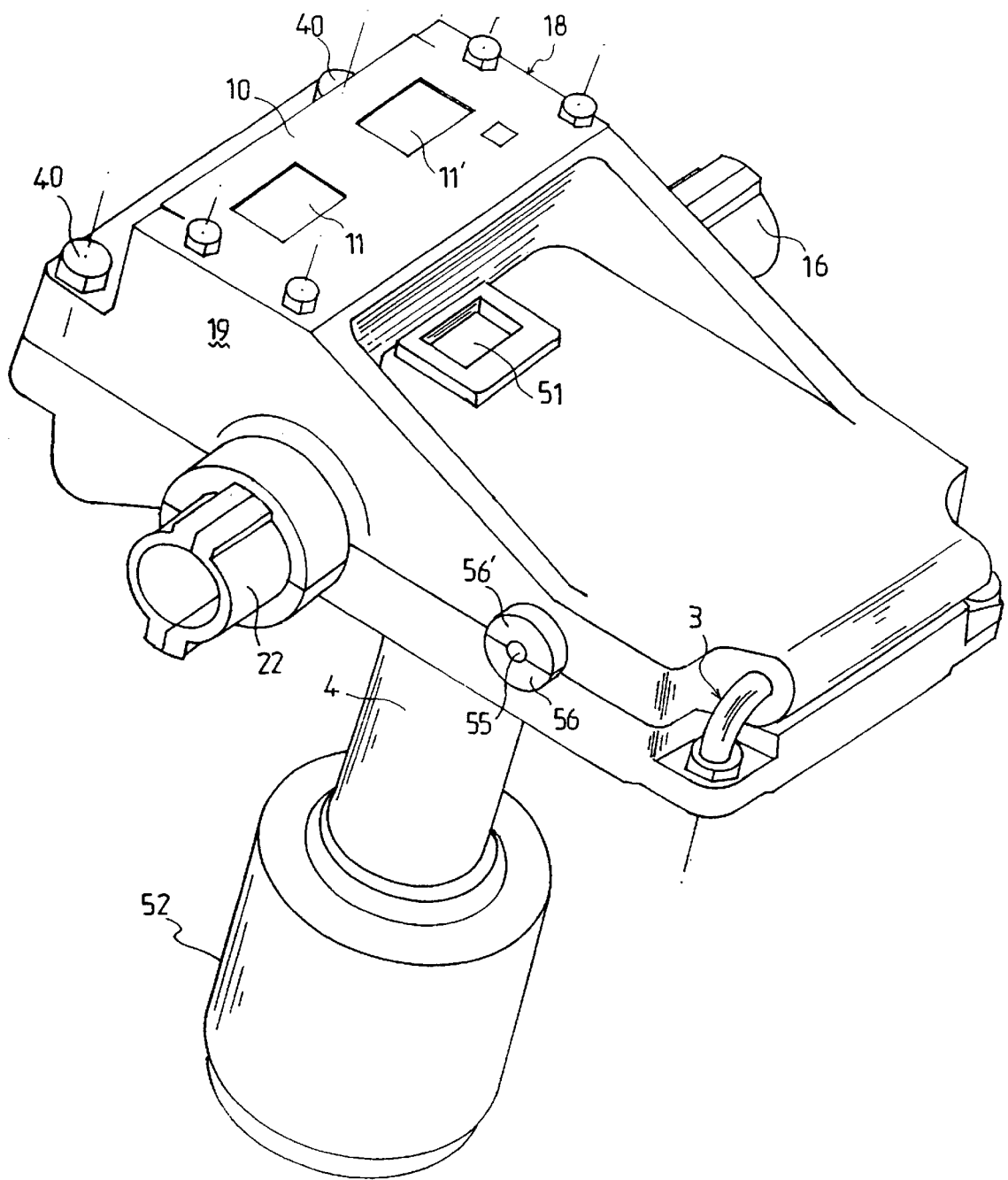
FIG. 11 is an angled view of the first variant of the apparatus presented in FIGS. 1 to 3, and which is shown closed as in FIG. 1.
Figure 12:
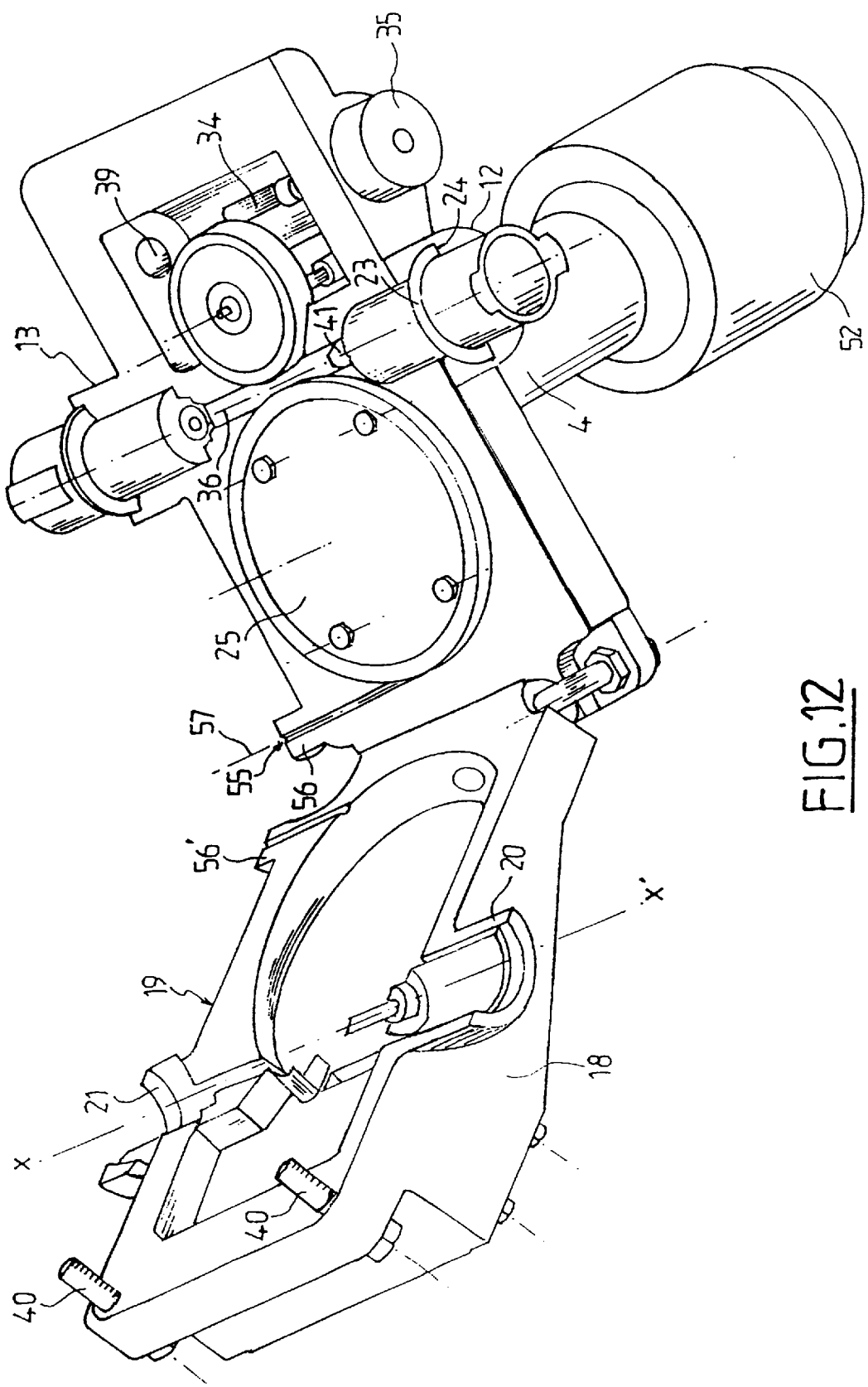
FIG. 12 is an angled view of the apparatus illustrated in FIG. 11, and which is shown open in FIG. 2.

In FIGS. 11 and 12, we have shown a variant of the apparatus on which is provided, on the exit bushing 22 side, in addition to the latter in its respective half couplings 15 and 15', an entry orifice 55 which is shaped like bushings 16 and 22. As shown in FIG. 12, the entry orifice 55 is formed of two cylindrical half couplings 56 and 56', respectively borne by base 1 and cover 2. The axis 57 of the entry orifice 55 is preferably parallel to the axis of bushings 16 and 22 and is practically tangent to the capstan 25. A means for sealing the entry orifice, not shown, is provided when the apparatus is expected to function as was described in relation to FIGS. 1 to 10, which is with a pressurized gas.

Entry orifice 55 is provided so that the apparatus shown in FIGS. 11 and 12 is capable of functioning in a mirror mode, or in other words, entry 55 is used as an entry passage for a cable or equivalent means that curls in a half circle around the circumference of the capstan 25, and then exits through the exit bushing 22.

Figure 13:
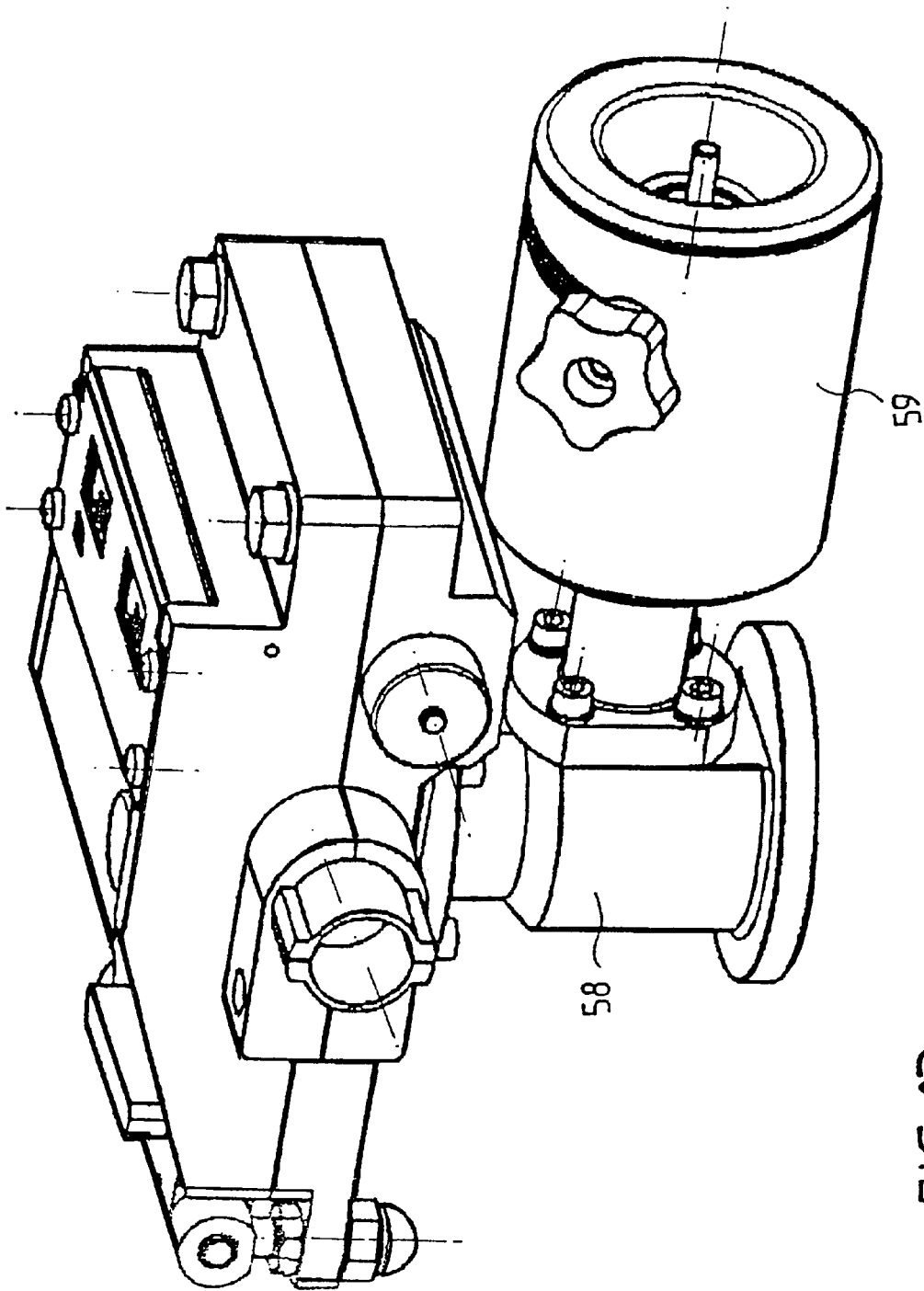
FIG. 13 is an angled view of a second variant of the design for the apparatus in FIGS. 1 to 3.

The FIG. 13 variant shows how we modify the handle extended by part 53 in which is housed a mechanical, fine, torque regulating clutch with indication of the amount of the maximum pushing or pulling force selected by the operator. In FIG. 13, handle 4 is replaced by a short handle 58 and part 53 is replaced by a similar part 59 which is not coaxial to handle 58, but of which the rotation axis is perpendicular to it and parallel to axis YY' shown in FIG. 5. The variant makes it possible to have an apparatus of which the height can be less than the apparatus in FIG. 1, for example, reduced to 15 cm. The mechanical coupling between parts 58 and 59 is performed traditionally.

What is claimed is:

1. A portable pushing and pulling apparatus for installing at least one cable in a conduit, the apparatus comprising a casing, which, seen from above, has the shape of a rectangle and includes a base connected to a cylindrical handle, a cover, a hinged joint connecting the base to the cover on a short side, a fastener arrangement to ensure closure of the cover on the base, a drive capstan connected to be driven by a rotary drive shaft which is mounted in the handle, an idler disk with an axle parallel to the capstan, the capstan and disk being mounted so as to receive the cable and being arranged so that cable can be driven and gripped between them, the drive shaft including a power take-off, and an end torque regulator located, in the handle, between the drive shaft and the power take-off, the end torque regulator including a torque limiting clutch and an indicator for indicating the value of a maximum pushing or pulling force selected by the operator.

2. The apparatus according to claim 1, including a further regulator for regulating a radial pressure exerted by the idler disk on the cable.

3. The apparatus according to claim 2, wherein the base includes a hollow in which the idler disk is located, the further regulator comprises an angle bracket formed by first and second bracket arms having a corner mounting an axle of the idler disk, the first bracket arm being mounted on a fixed pivot perpendicular to the bottom of said hollow, the second bracket arm bearing a nut through which passes a regulating screw pivoting around a pivot fixed in relation to the base, the regulating screw being able to be turned by an external thumb wheel which an operator can adjust.

4. The apparatus according to claim 1, wherein the cover has a bottom in a central area including an inspection opening for allowing at least partial viewing of the idler disk and evaluating a drive of the idler disk by the cable.

5. The apparatus according to claim 1, wherein the base has a compressed air entry valve so that when the valve is closed, the apparatus can be pressurized, and further including an exit bushing through which the cable is intended to exit, which exit bushing has an internal diameter larger than an external diameter of the cable so that pressurized air can escape through said exit bushing between the cable and the internal cylindrical wall of the exit bushing.

6. The apparatus according to claim 5, further including an entry bushing, through which the cable is adapted to be inserted, the entry busing being adapted to mount, on the inside, a sealing nipple through which the cable is adapted to enter the apparatus.

7. The apparatus according to claim 6, wherein the nipple comprises a hollow circular foot arranged to fit into a circular groove in the entry bushing, extended by a hollow cylindrical body, and then by a conical hollow point, the material forming the point being translucid or transparent, the point being cut so that the circle of the cut ensures a seal around the cable.

8. The apparatus according to claim 1, wherein each side edge of the base includes first half couplings that extend from the edges as external flanges, each of the half couplings respectively bearing a bushing having an external diameter corresponding to that of the first half couplings, each of the bushings having an internal diameter dependent on a cable to be driven, and, facing the first half couplings, the edges of the cover including the second half couplings which, when the apparatus is closed, fit the first half couplings to form rotation couplings in which the bushings are respectively housed.

9. The apparatus, according to claim 1, wherein the idler disk has a magnet on its outer edge for driving a revolution counter having a display visible in a window on the cover.

10. The apparatus, according to of claim 1, further including a shuttle having a cylindrical axial rod having an end in the shape of a larger hemispheric head, followed towards the rear by a conical skirt, which extends from the outer edge towards a thin protruding ring (50).

11. The apparatus, according to claim 1, wherein the exit side through which the cable to be pushed exits, includes an entry orifice having an axis is tangent to the capstan, the entry orifice being formed by cylindrical half couplings in the edges of the base and the cover, respectively.

12. The apparatus of claim 1, wherein the fastener arrangement includes a set of screws.

13. A portable pushing and pulling apparatus for installing at least one cable in a conduit, the apparatus comprising a casing, the casing including (a) a drive capstan connected to be driven by a rotary drive shaft which is mounted in the handle, and (b) an idler disk with an axle parallel to the capstan, the capstan and disk being mounted so as to receive the cable and being arranged so that cable can be driven and gripped between them, the drive shaft including a power take-off, and an end torque regulator located in the handle, between the drive shaft and the power take-off, the end torque regulator including a torque limiting clutch and an indicator for indicating the value of a maximum pushing or pulling force selected by the operator.

* * * * *